(12) United States Patent
Blanchard et al.

(10) Patent No.: US 7,487,107 B2
(45) Date of Patent: *Feb. 3, 2009

(54) METHOD, SYSTEM, AND COMPUTER PROGRAM FOR DETERMINING RANGES OF POTENTIAL PURCHASING AMOUNTS, INDEXED ACCORDING TO LATEST CYCLE AND RECENCY FREQUENCY, BY COMBINING RE-PURCHASING RATIOS AND PURCHASING AMOUNTS

(75) Inventors: Jean-Louis Blanchard, Quincy Sous Senart (FR); Hammou Messatfa, Levallois Perret (FR); Stephane Lorin, Paris (FR); Christelle Pavillon, Paris (FR)

(73) Assignee: International Business Machines Corporation, Armonk, NY (US)

( * ) Notice: Subject to any disclaimer, the term of this patent is extended or adjusted under 35 U.S.C. 154(b) by 34 days.

This patent is subject to a terminal disclaimer.

(21) Appl. No.: 11/768,454

(22) Filed: Jun. 26, 2007

(65) Prior Publication Data

US 2007/0250402 A1    Oct. 25, 2007

Related U.S. Application Data

(62) Division of application No. 10/324,281, filed on Dec. 19, 2002, now Pat. No. 7,280,974.

(30) Foreign Application Priority Data

Dec. 21, 2001  (EP)  .................................. 01480141

(51) Int. Cl.
*G06F 17/30* (2006.01)
(52) U.S. Cl. ................. 705/10; 707/3; 707/5; 707/102; 706/61; 705/14

(58) Field of Classification Search ..................... 705/10
See application file for complete search history.

(56) References Cited

U.S. PATENT DOCUMENTS

| | | | | |
|---|---|---|---|---|
| 6,014,661 A | * | 1/2000 | Ahlberg et al. | .................. 707/3 |
| 6,073,112 A | * | 6/2000 | Geerlings | ..................... 705/14 |
| 6,307,958 B1 | * | 10/2001 | Deaton et al. | ............... 382/139 |

(Continued)

OTHER PUBLICATIONS

Hall, Precipitation Forecasting Using a Neural Network, Weather and Forecasting, vol. 14, Issue 3, p. 338-45, Jun. 1999, http://ams.allenpress.com/archive/1520-0434/14/3/pdf/i1520-0434-14-3-338. pdf.*

(Continued)

*Primary Examiner*—Beth V Boswell
*Assistant Examiner*—Justin M Pats
(74) *Attorney, Agent, or Firm*—Schmeiser, Olson & Watts; William H. Steinberg (57) ABSTRACT

A system and a method for selecting potential purchasers from a historical collection of confirmed purchasers. The method allows definition of a set of purchasing variables in relation to the confirmed purchasers, and computation of both a plurality of re-purchasing ratios and a plurality of purchasing amounts using the set of purchasing variables. Potential purchasing amounts are generated by combining the previous results.

13 Claims, 5 Drawing Sheets

U.S. PATENT DOCUMENTS

| | | | | |
|---|---|---|---|---|
| 6,839,682 | B1* | 1/2005 | Blume et al. | 705/10 |
| 7,120,629 | B1* | 10/2006 | Seibel et al. | 707/5 |
| 2001/0014868 | A1* | 8/2001 | Herz et al. | 705/14 |
| 2002/0194058 | A1* | 12/2002 | Eldering | 705/10 |
| 2003/0216956 | A1* | 11/2003 | Smith et al. | 705/10 |

OTHER PUBLICATIONS

Hall, Tony; Precipitation Forecasting Using a Neural Network, Weather and Forecasting, vol. 14, Issue 3, Jun. 1999; pp. 338-345. http://ams.allenpress.com/archive/1520-0434/14/3/pdf/i1520-0434-14-3-338.pdf (last visited Oct. 4, 2006).

* cited by examiner

METHOD, SYSTEM, AND COMPUTER PROGRAM FOR DETERMINING RANGES OF POTENTIAL PURCHASING AMOUNTS, INDEXED ACCORDING TO LATEST CYCLE AND RECENCY FREQUENCY, BY COMBINING RE-PURCHASING RATIOS AND PURCHASING AMOUNTS

This application is a divisional of Ser. No. 10/324,281, filed Dec. 19, 2002.

FIELD OF THE INVENTION

The present invention generally relates to targeted marketing and more particularly to a system and method for selecting purchasers from a large pool of confirmed purchasers.

BACKGROUND

An important aspect of commercial marketing is the identification of potential purchasers either from new prospective customers or from confirmed purchasers that have already bought items. To better target their marketing campaigns, more and more companies use statistical models based on customer behavior. They store purchasing data including for example the date of a last purchase, the product purchased and the monetary value of the purchase.

Targeted marketing is one of the applications of predictive modeling. Some solutions are mainly focused on targeting prospective customers, i.e. customers without a first-time purchase. Other solutions are more specifically linked to product category or brand to configure promotion packages such as in U.S. Pat. No. 6,026,370 from Jermyn.

However, there is a need for a generic solution that is independent of any product category and that improves purchaser knowledge both at the individual level as well as at a general level. Such a solution would be an efficient tool for driving short and mid-term growth.

SUMMARY

Therefore, it is an object of the present invention to provide a system and method for determining potential purchasers with respect to a confirmed purchaser profile.

Another object of the invention is to determine a profile of confirmed purchasers that are most likely to respond positively to marketing solicitation.

In a preferred embodiment, the method of the invention allows selection of potential purchasers from a historical collection of confirmed purchasers, and comprises the steps of:
defining a set of purchasing variables in relation to the confirmed purchasers;
computing a plurality of re-purchasing ratios using the set of purchasing variables;
computing a plurality of purchasing amounts using the set of purchasing variables; and
computing a plurality of potential purchasing amounts by combining the results of the previous computing steps.

The method preferably operates over an observation duration $D_{hist}$' of the confirmed purchasers and with a set of purchasing variables that comprise a generation group variable '$G_i$' to group the confirmed purchasers according to their first respective purchasing date, a cycle variable '$C_t$' to evaluate the confirmed purchasers' seniorities, and a recency frequency class variable '$RF_{xy}$' to describe the confirmed purchasers' behaviors over several cycles.

The invention, as well as these and other related objects and advantages thereof, will be best understood by reference to the following detailed description to be read in conjunction with the accompanying drawings.

DETAILED DESCRIPTION

Figure 1:
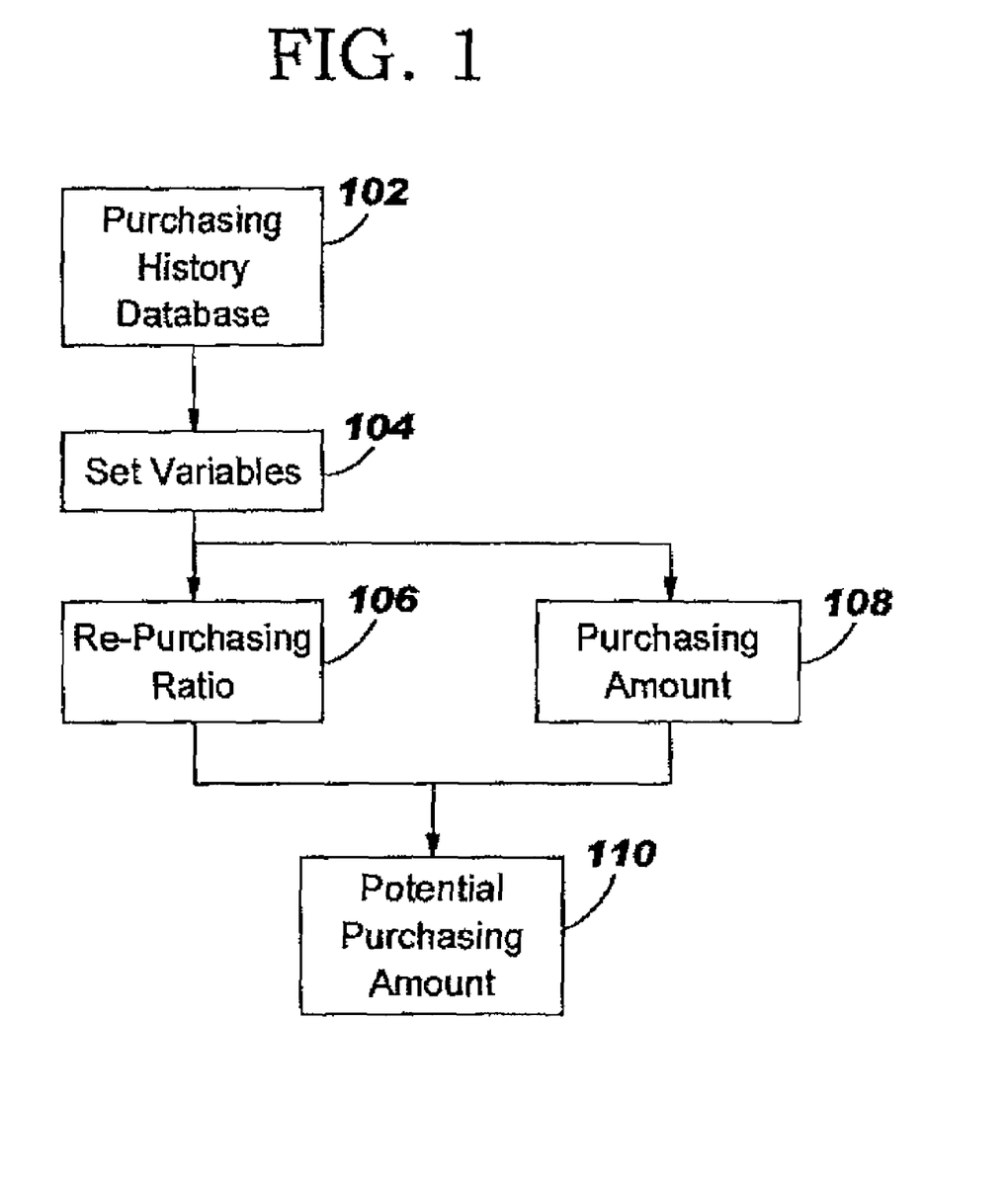
FIG. 1 is a flow chart to illustrate the general steps according to the present invention.

Referring to the drawings, and more particularly to FIG. 1, steps of the present invention are now described. Initially, a purchasing history database to be observed over a particular duration '$D_{hist}$' is collected in step 102. The historical database contains at least identifiers for each customer and purchasing data associating with the respective customer. It is to be appreciated that the term customer is employed in the description with the meaning of a confirmed purchaser, i.e. someone that has already bought at least an item having a non-nul monetary value. The purchasing data may include at least the date and the monetary value of the purchase.

In step 104, several variables to be further used by the present method are defined and preferably comprise:
the cycle '$C_t$' to evaluate the customer's seniority;
the duration '$D_{cycle}$' of the cycle;
the generation groups '$G_i$' to group customers by common purchasing date;
the duration '$D_{gen}$' of the generation;
a recency frequency class '$RF_{xy}$' to describe customer behavior over several cycles.

Figure 2:
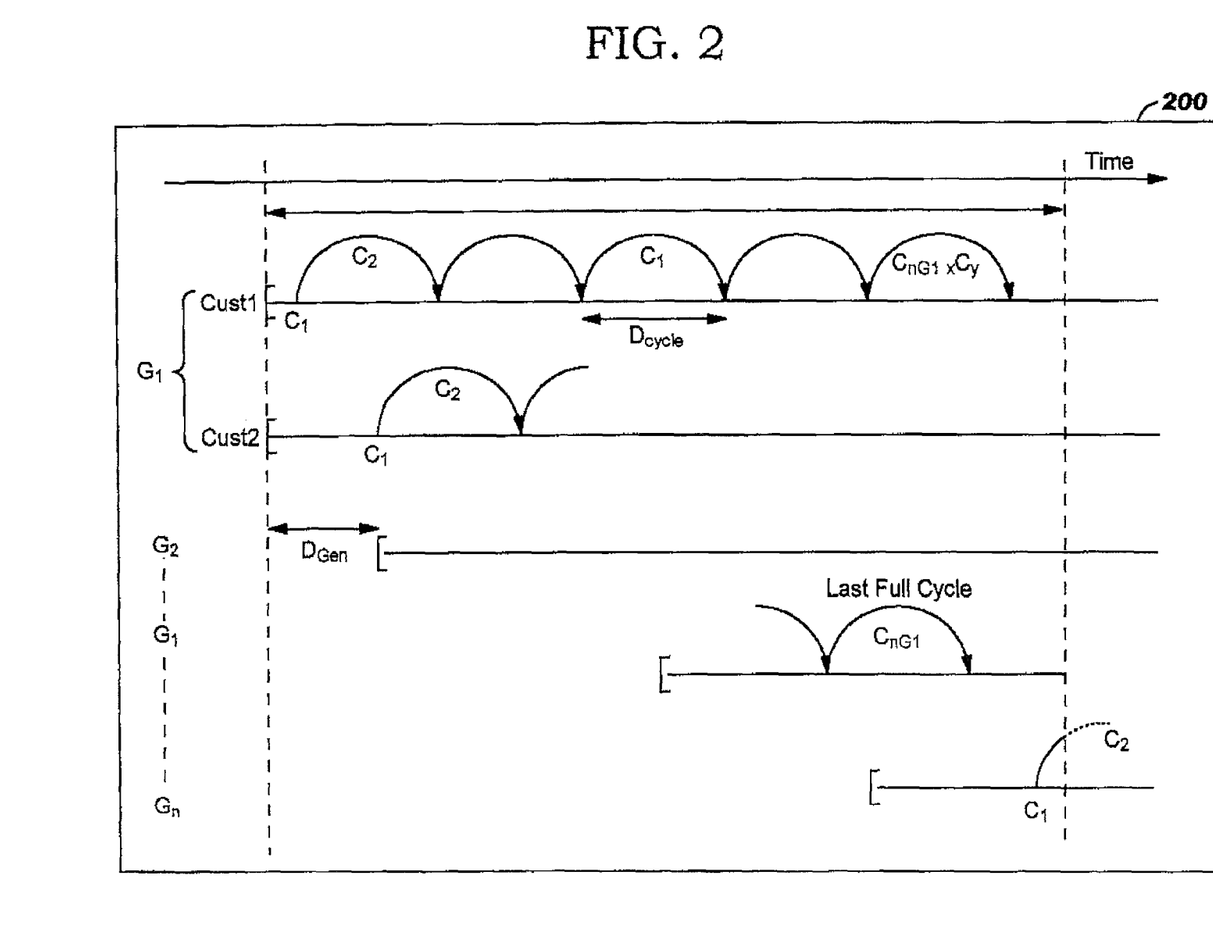
FIG. 2 is a timing diagram illustrating variables to be used by the method of the invention.

In the context of the invention and as illustrated in FIG. 2, the cycle '$C_t$' is defined as a time unit within the time observation of the purchasing history database. It is to be noted that the duration of the cycle is set from the second cycle, and that the very first cycle '$C_t$' is equal to an initial duration cycle.

In a commercial application, the initial duration cycle is fixed to one day, so the first cycle is equivalent to the date of the first purchase.

The generation variable allows grouping a plurality of customers '$Cust_j$' into homogeneous generation groups '$G_i$' in relation to the date of their first purchase. The maximum number 'N' of generation groups depends on '$D_{hist}$' and '$D_{gen}$' and is equal to $$N = INT\left[\frac{Dhist}{Dgen}\right], \tag{1}$$

wherein the 'INT' function returns the largest integer value that is less than or equal to the argument of the function.

As an example, for a history database having a starting date of Jan. 1st 1995 and an ending date of Dec. 31st 2000 (which means that $D_{hist}$=72), the maximum number of full observed cycles is equal to 'T=11' cycles for a duration of the cycles '$D_{cycle}$' fixed to six months. If the generation duration '$D_{gen}$' is fixed to one month, the maximum number of generation is then equal to 'N=71'. Then, for a customer having a first purchase date of Aug. 15th, 1997, the generation group to which he belongs is '$G_{32}$'. Each other customer that has a first purchasing date occurring during August 1997 belongs to the same generation group. It is to be appreciated that this example is just for illustration and does not limit the invention, as any other duration values could be defined according to the vendor activity.

The recency frequency class variable '$RF_{xy}$' is defined as a binary description of a customer behavior concatenated over a predefined number of cycles. The index 'xy' reflects two consecutive cycles, and 'x' and 'y' are respectively coded as a binary value of '1' if a purchase has occurred during the respective cycle and coded as '0' if not. In a preferred implementation, a four-bit coding is chosen for describing the recency frequency class over four consecutive cycles. Thereby, the purchasing prediction is based on the behavior of customers over the four last cycles.

As shown in the timing diagram 200 of FIG. 2, a different number '$n_{Gi}$' of full cycles occurs during the time observation '$D_{hist}$' for each generation group '$G_i$'. The maximum value of '$n_{Gi}$' is observed for the first generation group '$G_1$'; for sake of clarity this will be denoted 'T' in the rest of the description. Thus to recall, the cycles list may vary from '$C_1$' to '$C_T$' and the generation group list may vary from "$G_1$' to '$G_N$'.

The setting of the variables in step 102 allows customization of the variables '$D_{Gen}$' and '$D_{Cycle}$' to better fit the vendor field activity.

Next, two processes are performed in steps 106 and 108 taking into account the variables set in step 104.

In step 106, a re-purchasing ratio is computed for each customer. The re-purchasing ratio indicates the probability of purchasing during the next cycle. It is to be noted that several customers may have the same probability even if they belong to different generation groups. The result of the purchasing ratio operation is a plurality of ratios.

In step 108, a purchasing amount is computed for each customer. It is to be noted that several customers may have the same purchasing amount even if they belong to different generation groups. The result of the purchasing amount operation is a plurality of amounts.

Finally, in step 110 for each customer, a potential purchasing amount is estimated by cross-computing the results of the two previous steps 106 and 108. A scorecard is generated that may be displayed on a display screen. The scorecard indicates score values with respect to the recency frequency class and the cycles that may be interpreted by a user to better target a marketing campaign.

Figure 3:
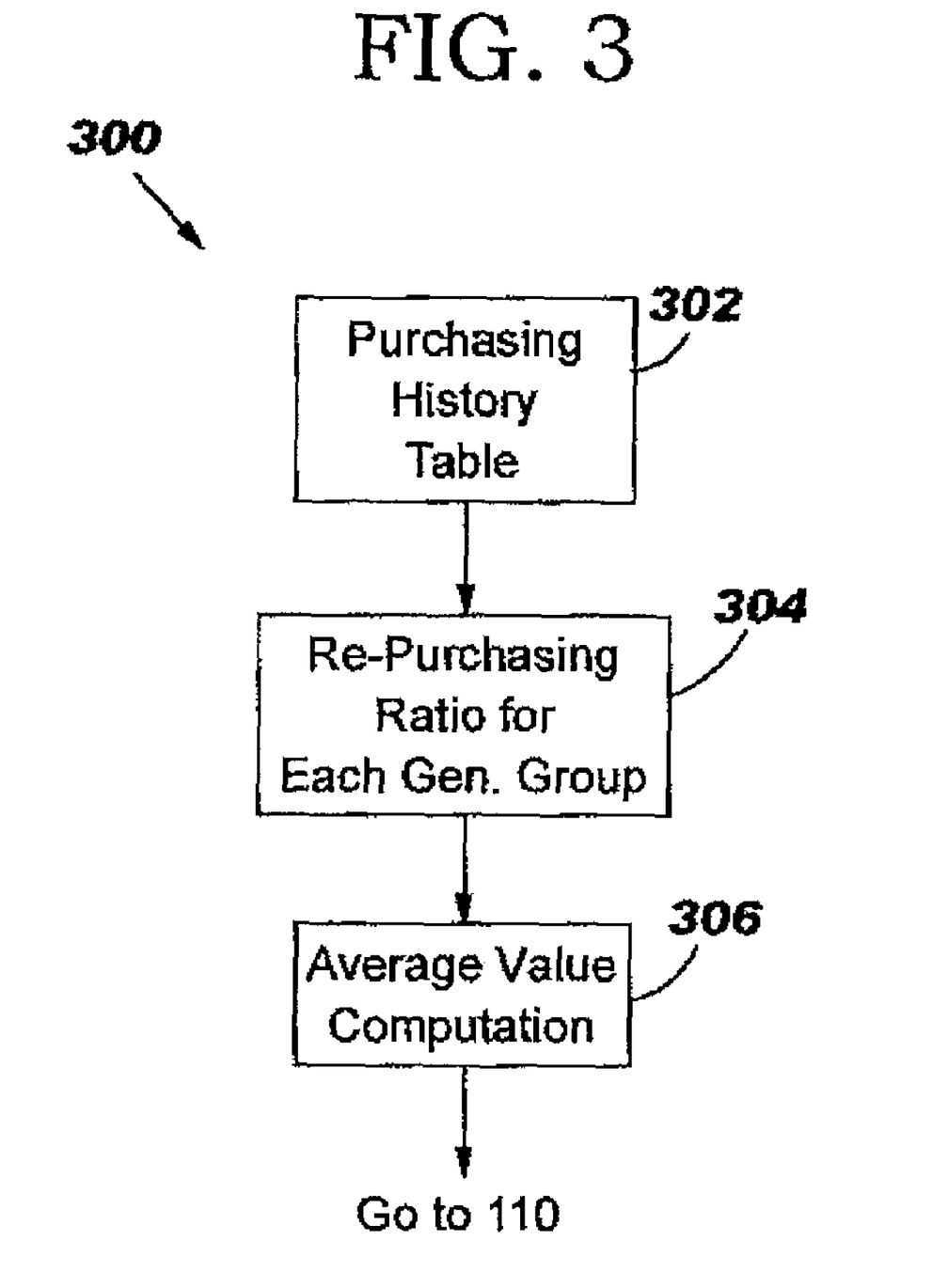
FIG. 3 is a detailed flow chart of the purchasing ratio step of FIG. 1.

Referring now to FIG. 3, a detailed sequence 300 of the steps to generate the re-purchasing ratio is described. The sequence begins in step 302 by generating a purchasing history table taking into account the different variables set during step 104 as described above. The result is a table having a first column for identifying the customer, and a second column for indicating the generation group of the customer. The table further comprises a third column for indicating the current cycle '$C_t$' with 't' varying from 1 to '$n_{Gi}$' for each customer, a fourth column for indicating the recency frequency class associated with the current cycle, and a fifth column for indicating the amount spent by the customer during the current cycle.

In next step 304, a probability of re-purchasing is computed from the purchasing history table using the recency frequency class '$RF_{xy}$' that has been previously defined, according to the following $$P[G_i, RF_{xy}, C_t] = \frac{N_{cust}[G_i, RF_{1x}, C_{t+1}]}{N_{cust}[G_i, RF_{xy}, C_t]} \quad (2)$$

formula:

wherein 'i' varies from 1 to 'N' and 't' varies from 1 to '$n_{Gi}-1$' and wherein $N_{cust}$ is the number of customers of the respective generation group, recency frequency class and cycle.

It is to be appreciated that the recency frequency class denoted as '$RF_{1x}$' for the numerator means that a purchase has occurred during the cycle '$C_{t+1}$' (coded as the '1'); it does not matter whether a purchase has occurred during the cycle '$C_t$' (coded as 'x' which may be '1' or '0'). Similarly, the recency frequency class denoted as '$RF_{xy}$' for the denominator means that a purchase has occurred or not during the cycle '$C_t$' (coded as 'x') and that a purchase has occurred or not during the cycle '$C_{t-1}$' (coded as 'y').

In the cases where the number of customers by cross-category of RF class, by generation group and by cycle is not enough to compute a robust probability, the recency frequency classes are preferably concatenated together.

In the next step 306, the average value of the previous re-purchasing ratios is computed over the number of generation groups. The result is then noted as:

$$P[RF_{xy}, C_t] \quad (3),$$

wherein 't' varies from 1 to 'T-1'.

Those skilled in the art will appreciate that the average value could be estimated with any other appropriate analytical function such as the normal or the polynomial regression for example.

Figure 4:
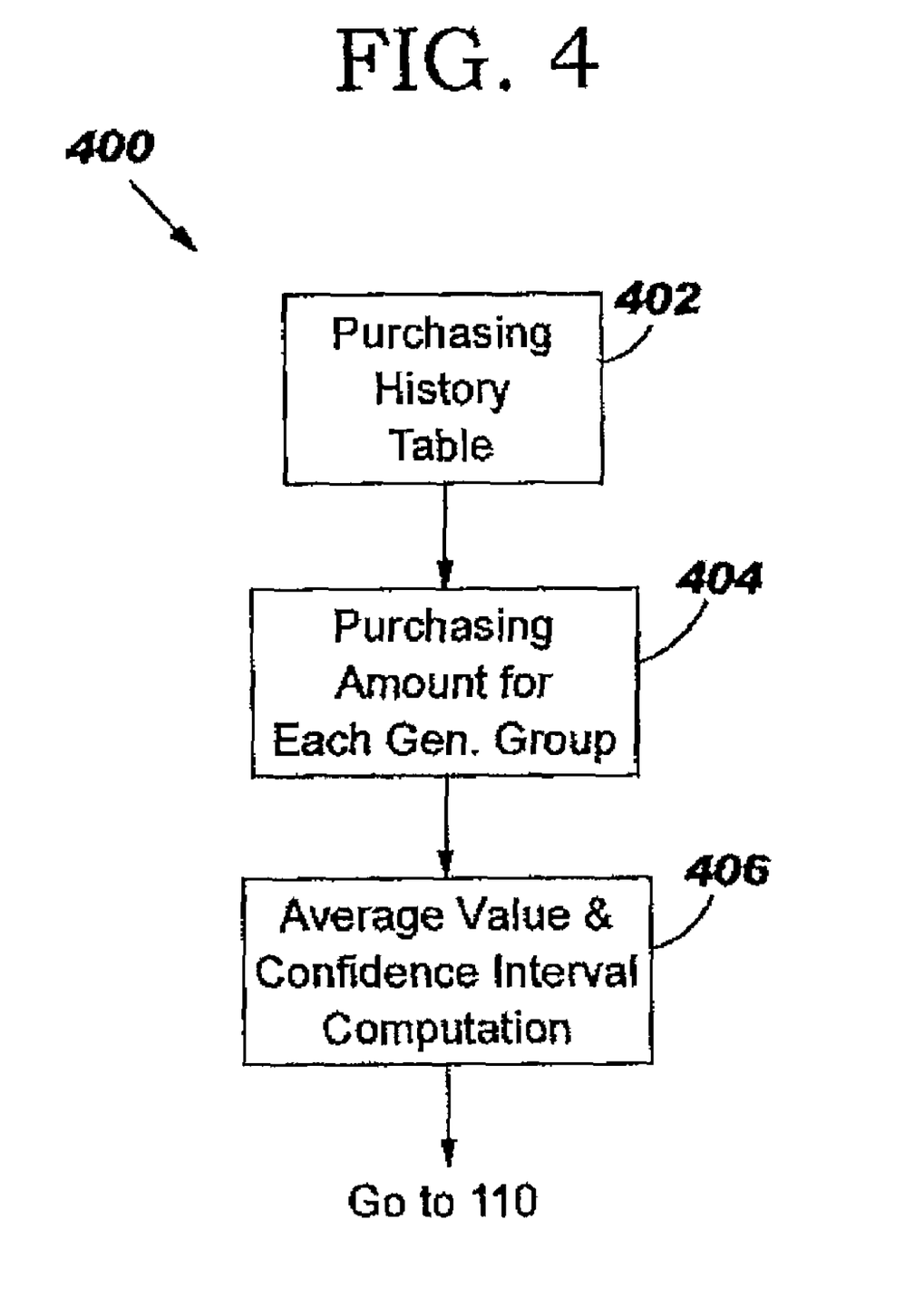
FIG. 4 is a detailed flow chart of the purchasing monetary step of FIG. 1.

Going to FIG. 4, a detailed sequence 400 of the purchasing amount step 108 of FIG. 1 is now described. The sequence begins in step 402 by generating the purchasing history table as mentioned previously with reference to step 302.

In step 404, the average values of the purchasing amounts of customers belonging to an identical generation group and having an identical recency frequency class within the same cycle are computed. The result is then noted as:

$$M[G_i, RF_{xy}, C_t] \quad (4)$$

wherein 'i' varies from 1 to 'N' and 't' varies from 1 to '$n_{Gi}-1$'.

Finally in step 406, the average value of the previous average values of the purchasing amounts is computed over the number of generation groups. The result is noted as:

$$M[RF_{xy}, C_t] \quad (5),$$

wherein 't' varies from 1 to 'T'.

Furthermore, a minimum value and a maximum value of the purchasing amounts are estimated. These values refer to the boundaries of a confidence interval at 95% of the purchasing amount. The results are then noted as:

$$M_{min}[RF_{xy}, C_t] \text{ and } M_{max}[RF_{xy}, C_t] \quad (6)$$

wherein 't' varies from 1 to 'T'.

As in the method steps of FIG. 3, for the cases where the number of customers by cross-category of RF class, by generation group and by cycle is not enough to compute a robust probability, the recency frequency classes are preferably concatenated together.

The final step of sequences 300 and 400 is the potential purchasing amount computation referred to as step 110. Three matrices are then generated to respectively indicate the minimum, the maximum and the value of a potential purchasing amount for a given recency frequency class and a given cycle.

In commercial application, a customer is characterized by his recency frequency class and his cycle. From these characteristics, a minimum, a maximum and a value are thus determined using the predictive matrices.

Figure 5:
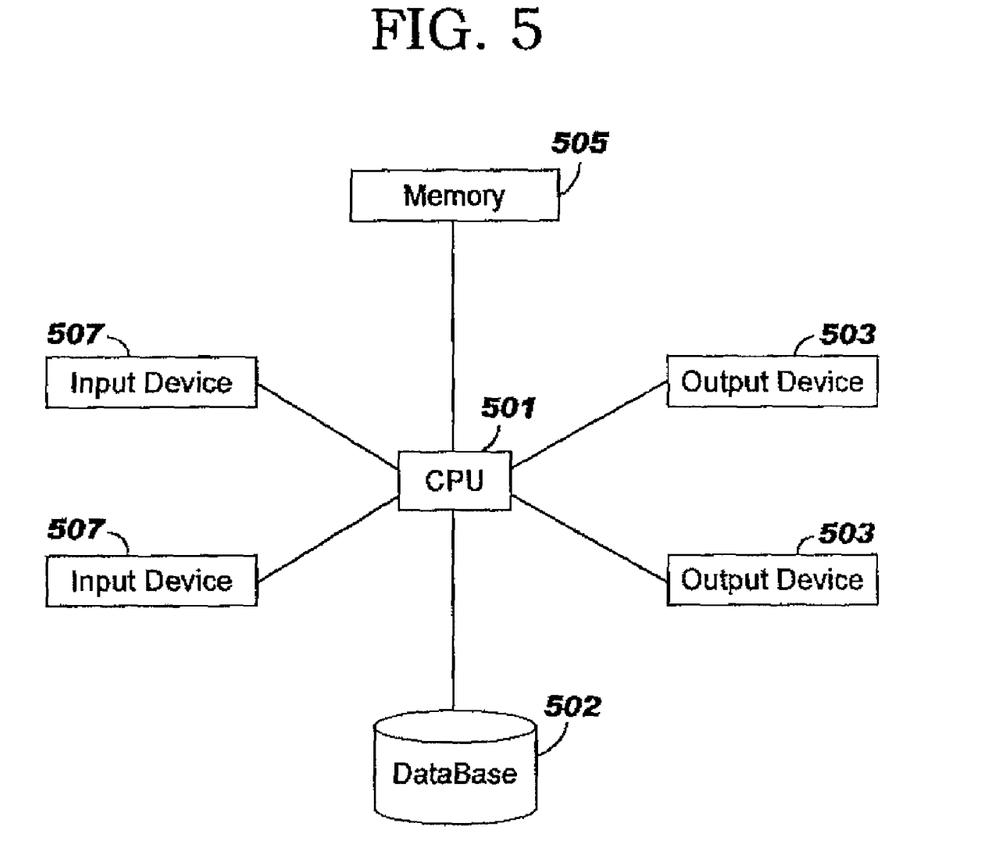
FIG. 5 is a block diagram showing a hardware platform on which the invention may be implemented.

The invention is preferably implemented as a computer process executed on a computer system, including, for example, an IBM Personal Computer (PC), and an IBM RS6000 workstation, an IBM RS6000 SP2 multiprocessor system, or on an IBM S/390 system. The system, shown in generalized form in FIG. 5, includes at least one input device 507, at least a central processor unit 501, at least one storage device storing a database 502, memory 505 and at least one output device 503. The input device 507 may be a workstation or terminal having means for operating the appropriate software for allowing a user to select the data used by the process of the invention, to set the variables, and to issue commands to control the process steps in accordance of the present invention. Processor 501 may be of a conventional type sufficient to perform the calculation and to retrieve/store information from/to the database stored in the storage device 502 and memory 505 according to signals from the input device. Storage device 502 may be any conventional storage device, such as a direct access storage device (DASD), such as a hard disk drive, a tape, compact disk (CD) read only memory (ROM), or the like, capable of storing data records therein of the type to be used in accordance with the present invention. Preferably, the customer and purchasing history records are stored in a database facilitating high speed data retrieval. As shown in FIG. 5, the system processor 501 accesses the database on storage device 502 and performs the ratio calculations to generate the potential purchasing amounts that may be output on the output unit 503. The output unit 503 may be a character or graphical display terminal, or various types of printing devices. If desired, the connections between input devices 507 and processor 501 may be bi-directional in nature, so that the input devices 507 may also serve as the output devices 503.

While the invention has been described in terms of a preferred embodiment, those skilled in the art will recognize that the invention can be practiced with modifications within the spirit and scope of the appended claims.

We claim:

1. A computer implemented method for determining ranges of purchasing amounts, said method comprising:
    accessing purchasing data from a historical database of confirmed purchasers such that each confirmed purchaser has purchased at least one item having a non-null monetary value, wherein the historical database comprises the purchasing data for each confirmed purchaser within a historical duration that includes N consecutive generations and T consecutive cycles, wherein each generation is associated with a generation group consisting of all confirmed purchasers who have made a first purchase of an item of the at least one item within the associated generation, wherein each cycle of the T consecutive cycles is a time unit for analysis of the purchasing data for each confirmed purchaser, wherein N is at least 2, and wherein T is at least 3;
    determining on a computer processor re-purchasing ratios from the accessed purchasing data, wherein the re-purchase ratios indicate a probability of purchasing in a next cycle of the T consecutive cycles immediately following a latest cycle of the T consecutive cycles, wherein the re-purchase ratios are indexed according to generation group, latest cycle, and recency frequency class, wherein the recency frequency class is a binary descriptor of purchases over M consecutive cycles of the T consecutive cycles, wherein the M consecutive cycles end with the latest cycle, and wherein M is at least 2;
    determining purchasing amounts from the accessed purchasing data, wherein the purchasing amounts are indexed according to generation group, latest cycle, and recency frequency class;
    computing on the computer processor potential purchasing amounts in the next cycle by combining the re-purchasing ratios and the purchasing amounts, wherein the potential purchasing amounts are indexed according to latest cycle and recency frequency class; and
    outputting the potential purchasing amounts to an output device of a computing system;
    wherein the recency frequency class is identified by a concatenation of binary values respectively corresponding to the cycles of the M consecutive cycles, wherein the binary value for the respective cycle is 1 if a purchase of one or more items of the at least one item occurred in the respective cycle, and wherein the binary value for the respective cycle is 0 if a purchase of one or more items of the at least one item did not occur in the respective cycle.

2. The method of claim 1, wherein M=2.

3. The method of claim 1, wherein M=4.

4. The method of claim 1, wherein the re-purchase ratio for each generation group is a ratio of A to B: wherein A is the total number of confirmed purchasers in said each generation group for the next cycle pertaining to the respective latest cycle; and wherein B is the total number of confirmed purchasers in said each generation group for the respective latest cycle and the respective recency frequency class.

5. The method of claim 1,
    wherein the method further comprises computing average re-purchase ratios index according to cycle and recency frequency class by averaging the re-purchase ratios over the generation groups according to which the re-purchase ratios are indexed; and
    wherein said computer potential purchasing amounts in the next cycle comprises combining the average re-purchasing ratios and the purchasing amounts.

6. The method of claim 5,
    wherein the method further comprises computing average purchasing amounts indexed according to cycle and recency frequency class by averaging the purchasing amounts over the generation groups according to which the purchasing amounts are indexed; and
    wherein said computing potential purchasing amounts in the next cycle comprises combining the average re-purchasing ratios and the average purchasing amounts.

7. The method of claim 6,
    wherein the method further comprises computing minimum purchasing amounts and maximum purchasing from the purchasing amounts, such that the minimum purchasing amounts and maximum purchasing amounts are indexed according to cycle and recency frequency class; and
    wherein said computing potential purchasing amounts in the next cycle further comprises combining the average re-purchasing ratios and the minimum purchasing amounts and combining the average re-purchasing ratios and the maximum purchasing amounts.

8. The method for claim 7, wherein said computing the minimum purchasing amounts and the maximum purchasing amounts comprises computing the minimum purchasing amounts and the maximum purchasing amounts as boundaries of a 95% confidence interval with respect to the average purchasing amounts.

9. The method of claim 1, wherein the method further comprises prior to aid accessing purchasing data, collecting the purchasing data into a purchasing history table and storing the purchasing history table in the historical database in accordance with a format of the purchasing history table, and wherein said accessing purchasing data comprises accessing the purchasing data from the purchasing history table.

10. The method of claim 9, wherein the format of the purchasing history table comprises:

A column for identifying a confirmed purchaser of the confirmed purchaser;

a column for indicating a generation group to which the confirmed purchaser belongs;

a column for indicating a current cycle for the confirmed purchaser;

a column for indicating a recency frequency class associated with current cycle, and a column for indicating a purchase amount spent by the confirmed purchaser during the current cycle.

11. The method of claim 1, wherein the output device is a display terminal or a printing device 12. A computer system comprising a processor and a computer readable memory unit coupled to the processor, said memory unit containing software commands that when executed by a processor perform the method of claim 1.

13. A computer readable medium having computer readable program code embodied therein, which upon being executed the program code performs the method of claim 1.

* * * * *